United States Patent [19]

Tani

[11] 4,171,904

[45] Oct. 23, 1979

[54] IMAGE FORMING DEVICE OF COPYING APPARATUS OF THE VARIABLE DUPLICATE SIZE TYPE

[75] Inventor: Tatsuo Tani, Tokyo, Japan

[73] Assignee: Ricoh Co., Ltd., Japan

[21] Appl. No.: 871,250

[22] Filed: Jan. 23, 1978

[30] Foreign Application Priority Data

Jan. 25, 1977 [JP] Japan .................................. 52/6346

[51] Int. Cl.[2] ............................................. G03B 27/52

[52] U.S. Cl. ..................................................... 355/55

[58] Field of Search ............................ 355/55, 57, 60

[56] References Cited

U.S. PATENT DOCUMENTS

| | | | |
|---|---|---|---|
| 3,476,478 | 11/1969 | Rees | 355/55 |
| 3,917,393 | 11/1975 | Nier | 355/57 X |
| 3,996,596 | 12/1976 | Kurtik | 355/55 X |
| 4,084,897 | 4/1978 | Queener | 355/60 X |

FOREIGN PATENT DOCUMENTS

| | | | |
|---|---|---|---|
| 967796 | 5/1975 | Canada | 355/55 |

*Primary Examiner*—Donald A. Griffin
*Attorney, Agent, or Firm*—McGlew and Tuttle

[57] ABSTRACT

In copying apparatus capable of producing a duplicate from an original by varying the size of the former from that of the latter, a change tends to occur in the exposure of an image forming surface when the rate of magnification or reduction is varied, with a result that the image forming surface is either overexposed or underexposed. To obviate this defect, a mirror is mounted in the vicinity of the original in such a manner that the distance between the mirror and the original and the length of a short side of the effective reflecting surface of the mirror corresponding to the width of a slit for exposing the image forming surface to the original are kept constant. By this arrangement, it is possible to keep constant at all times the exposure of the image forming surface, irrespective of a change in the rate of magnification or reduction.

10 Claims, 2 Drawing Figures

IMAGE FORMING DEVICE OF COPYING APPARATUS OF THE VARIABLE DUPLICATE SIZE TYPE

BACKGROUND OF THE INVENTION

1. Field of the Invention

The invention relates in general to an image forming device for a photocopying apparatus and, in particular, to a new and useful image forming device for copying apparatus of the type which are capable of forming duplicates of a size different from the size of an original.

2. Description of the Prior Art

In copying apparatus of the variable duplicate size type, particularly in copying apparatus of the type generally used which is adapted to produce a duplicate of a reduced size from an original, the light flux passing through the optical system for exposing an image forming surface to a optical image of an original tends to become high in intensity within a slit mounted in the vicinity of the image forming surface. The result of this is that the image forming surface tends to be overexposed.

When an original is copied to produce a duplicate which is a different size than the original, a great change is generally produced in the volume of light illuminating a photosensitive member per unit area depending on the rate of magnification or reduction. The intensity of illumination E (1x) of an image at a given magnification can be expressed by the following formula $$E = \frac{\tau\pi L}{4} \cdot \frac{(\phi/f)^2}{(1+\beta)^2}\ (lx) \qquad (1)$$

where $\beta$ is the degree in change of the size of the duplicate, L (cd/m$^2$) is the luminocity of a unit area of the original disposed on the optical axis and arranged perpendicularly thereto, $\tau$ is the transmission factor of the lens system, f (m) is the focal distance of the lens, and $\phi$ (m) is the effective aperture of the lens.

Since $\tau$, L, $\phi$, and f are constant in copying apparatus of common use having a single lens system, the intensity of illumination of the image E can be expressed as follows:

$$E = K_0 \frac{1}{(1+\beta)^2}\ (lx) \qquad (2)$$

In copying apparatus wherein a slit exposing system is used, the width of the slit relative to the image forming surface is restricted to a value below a certain level due to the conditions placed by the charger and developer or the condition placed by the diaphragm plate. Assume that the width of the slit relative to the image forming surface is constant $W_1$ (m) without the conditions placed by the throttle plate and the like being unchanged by the rate of change of the size of the duplicate, the exposure $I_1$ (1x·sec) of a photosensitive member at the duplicate size change rate $\beta$ can be expressed as the product of the intensity of illumination of the image and the time during which the photosensitive member is exposed.

$$I_1 = K_0 \frac{1}{(1+\beta)^2} \cdot \frac{W_1}{V} \qquad (3)$$

where v (m/sec) is the velocity of the photosensitive member. As compared with the exposure obtained when a duplicate of the same size as an original is produced, the exposure increases up to about 180 percent when the rate of reduction is ½ and decreases to 65 percent when the rate of enlargement is 1.5.

Due to the fact that a great change in exposure is caused by the duplicate size change in producing a copy, the photosensitive member becomes either overexposed or underexposed. This is not acceptable in copying apparatus which adopt an electrophotographic system or any other system.

To solve this problem, proposals have hitherto been made to use a method which provides light volume control means for varying the light volume in accordance with the duplicate size change rate, or to use a method which provides means on the surface of an original for regulating the width of the slit to a predetermined level to thereby keep the exposure constant.

As a method to provide exposure control means which can vary the volume of light depending on the duplicate size change rate, a lens having a variable diaphragm may be used and the amount of light entering the lens may be varied in conjunction with the movement of the lens each time the duplicate size change rate is varied; a movable diaphragm plate may be mounted in the vicinity of the image forming surface and the diaphragm plate may have its shape changed or the diaphragm plate may be moved in conformity with the duplicate size change rate so as to thereby change the width of the slit; or the volume of emanated light, the efficiency of illumination, the efficiency of emanating light, and the time during which light is emanated may be varied. All of these methods require the use of a special device for compensating for a change in the exposure, so that they have the disadvantages of rendering the apparatus complex in construction, increasing cost and lowering the reliability of the performance of the apparatus. Moreover, it is impossible to effectively compensate for a change in exposure by these methods, and difficulties are encountered in placing the exposure within the tolerance limits.

The method for limiting the width of a slit to a predetermined level can achieve marked results in compensating for a change in exposure. However, in copying apparatus of the type in which the original is placed in an original placing station to perform slit exposing of the image forming surface to the original, it is difficult in actual practice to restrict the width of the slit at the surface of the original because presence of the original placing glass surface or glass placing support deck interferes with this arrangement. Moreover, when this method is used, there is a change in the volume of light when a duplicate of a reduced size is produced, so that the method does not lend itself to use with copying apparatus in which a process sensitive to a change in the light volume is used.

SUMMARY OF THE INVENTION

This invention has as its object the provision of an image forming device of a copying apparatus of the variable duplicate size type which is capable of obviating the aforementioned disadvantages of the prior art in eliminating a change in the exposure of the image forming surface when a duplicate differing in size from an original is produced.

The object of the invention is accomplished by limiting to a certain level the length of a short side of the effective reflecting surface of a mirror, mounted in the vicinity of an original, which corresponds to the width of an exposing slit used for scanning the original.

The outstanding characteristics of the invention are that the distance between the original and the mirror of the image forming optical system mounted near the original is kept constant, and that the length of a short side of the effective reflecting surface of the mirror corresponding to the width of a slit for exposing an image forming surface to the original is limited to a certain level. By virtue of these features, the movement of a lens and mirrors of the optical system necessitated by a variation in the rate of magnification or reduction for producing a duplicate automatically causes the width of the slit or the width of the original, to which the image forming surface is exposed, to be varied. Thus an appropriate exposure of the image forming surface can be obtained when the rate of magnification or reduction is varied in producing a duplicate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
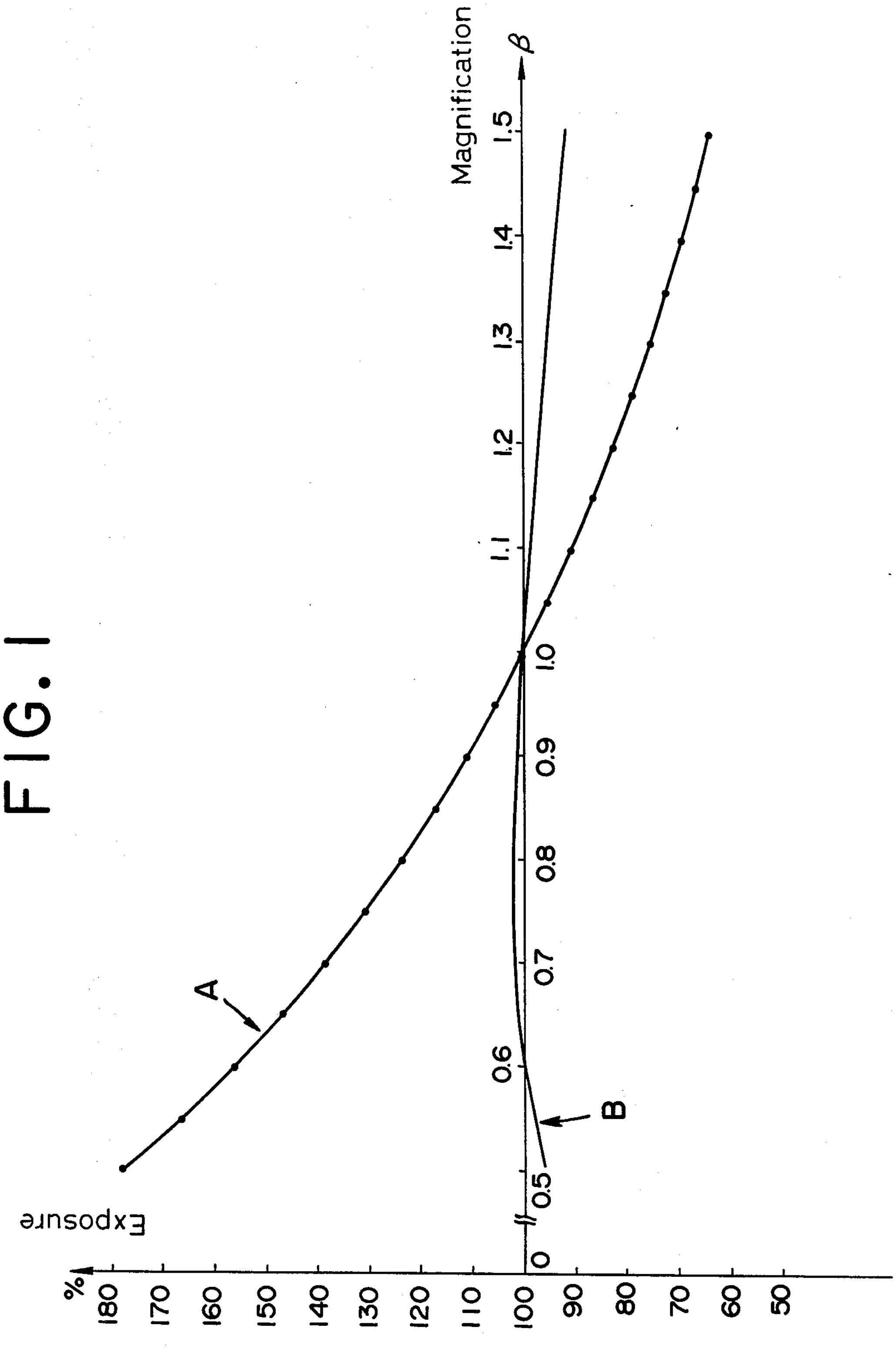
FIG. 1 is a graph showing the relation between the duplicate size change rate and the exposure ratio which is obtained when the width of the slit is regulated relative to the image forming surface in the prior art and when the present invention is practiced, with the duplicate size change rate being set forth along the horizontal axis and the exposure ratio being set forth along the vertical axis.

A preferred embodiment of the invention will now be described by referring to the accompanying drawings. In FIG. 1, curve A shows the ratio of the exposure when the rate of change in the size of duplicates is altered compared to the exposure obtained when a duplicate of the same size as the original ($\beta=1$) is produced when the width of the slit mounted near the image forming surface is constant. It will be seen that when the size of a duplicate is reduced to ½ the size of the original the exposure increases to 180 percent and that when a duplicate is enlarged to 1.5 times the size of the original the exposure decreases to 65 percent.

Figure 2:
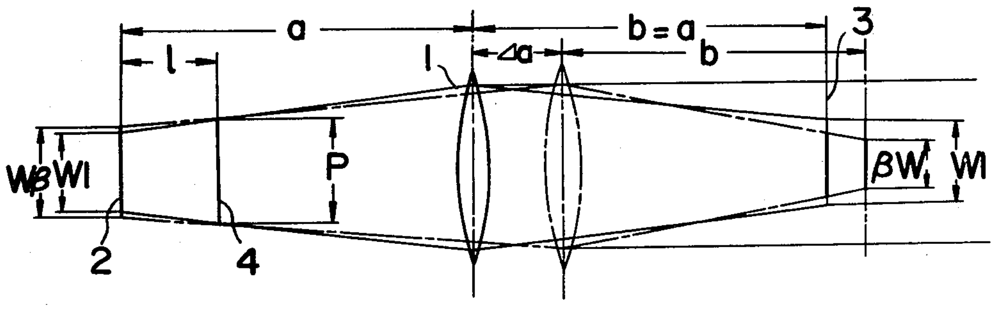
FIG. 2 is a diagrammatic illustration of the influence of the width of the slit on the image forming surface when a short side of the effective reflecting surface of the mirror is regulated according to the invention.

Referring now to FIG. 2, the apparatus comprises an original, schematically shown at 2, which is spaced from a mirror 4 by a distance 1. Mirror 4 has a short edge of width P and is disposed between the original 2 and a lens 1 for directing and focusing light rays emanating from the original 2 onto an image forming surface 3. When a duplicate of the same size as the original is to be formed, lens 1 is positioned so that the distance between lens 1 and original 2 is equal to a and the distance between the lens 1 and the image forming surface 3 is b, where a=b for this case. When the size of the duplicate image forming surface 3 is to be changed with respect to the size of the original 2, the lens 1 is moved to, for example, a position 1' which causes the focusing of light rays, now shown in dot-dash line, onto the image forming surface 3'. For producing an image on the image forming surface 3 of the same size as the original 2, the original 2 is exposed by light through a slit having a width W1.

A change in the exposure of the image forming surface produced by limiting the length of the short side of the effective reflecting surface of a mirror arranged near the original instead of arranging the slit near the image forming surface can be obtained as follows.

The intensity of illumination of an image on the photosensitive member is expressed as follows from formula (2):

$$E = K_0 \frac{1}{(1+\beta)^2} \; (lx)$$

Since the exposure $I_2$ (1x·sec) is the product of the intensity of illumination and the time during which the photosensitive member is exposed t (sec), the exposure is expressed as follows:

$$I_2 = Et \; (lx \cdot \text{sec}) \qquad (4)$$

By denoting the velocity of the photosensitive member by v (m/sec) and the width of the slit for exposing the photosensitive member by $W\beta$(m), the rate of movement t is expressed as follows:

$$t = \frac{\beta W\beta}{v} \; (\text{sec}) \qquad (5)$$

Let us consider changes in the width of the slit for exposing the photosensitive member to the original $W\beta$ which are caused by variations in the size of duplicates to be produced. When the lens 1 is located in a position spaced from an original 2 by a distance a in FIG. 2, the image of the original 2 is formed on an image forming surface 3, which is spaced from the lens 1 by a distance b. If necessary, at least one reflector may be mounted for the lens 1 in the optical system. The mirror 4 has an effective reflecting surface of a width P (m). With the first mirror 4 mounted, the following relations exist between; the width W1 (m) of the slit for exposing the image forming surface to the original 2 for producing a duplicate of the same size as the original (b=a), the spacing l (m) between the original 2 and the first mirror 4 when (b=a), the effective diameter d (m) of the lens 1, and the distance Δa (m) covered by the movement of the lens 1 (to a dash-dot line position) from its position for producing a duplicate of the same size as the original 2 with the rate of change of the size of duplicate of $\beta$:

$$\frac{p/2 - W_1/2}{l} = \frac{D/2 - W_1/2}{a} \qquad (6)$$

$$\frac{p/2 - W\beta/2}{l} = \frac{D/2 - W\beta/2}{a + \Delta a} \qquad (7)$$

If the focal length of the lens is denoted by f (m), the following formula is obtained:

$$\Delta a = \left(\frac{1}{\beta} - 1\right) f(m) \qquad (8)$$

From formulas (6), (7) and (8), the width $W\beta$ of the slit for exposing the image forming surface to the original 2 when the rate of change of the size of the duplicate is $\beta$ is expressed as follows:

$$W\beta = \frac{\{a + (1/\beta - 1)f\}(a - l)W_1 + (1/\beta - 1)flD}{a\{a + (1/\beta - 1)f - l\}} \ (m) \qquad (9)$$

Therefore, $$I_2 = K_0 \frac{\beta}{(1+\beta)^2} \cdot \frac{\{a + (1/\beta - 1)f\}(a - l)w_1 + (1/\beta - 1)flD}{va\{a + (1/\beta - 1)f - l} \ (lx \cdot sec) \qquad (10)$$

Curve B in FIG. 1 shows, as an example, the relation between the exposure ratio and the duplicate size change rate which is obtained when a=0.4624(m), f=0.22723 (m), l=0.049 (m), W1=0.015 (m), D=0.04545 (m) and v=0.21 (m/sec).

From the curve B, it will be seen that a change in the exposure is very small in a region in which the sizes of the duplicates produced are smaller than that of the original. This indicates that it is possible to eliminate the need to use an additional device for producing duplicates of sizes smaller than the size of the original in copying apparatus solely intended to produce duplicates of originals by reducing the size.

In accordance with the invention, the length of the short side or edge of the effective reflecting surface of the mirror 4 or the first mirror of the image forming optical system arranged in the vicinity of the original 2, which corresponds to the width of the slit for exposing the image forming surface to the image 2, is limited to a predetermined level at all times. By this arrangement, the width of the slit or the width of the image forming surface 3 of the photosensitive member exposed to the original 2 can be automatically varied as the lens and mirrors of the optical system move when the rate of change of size of the duplicate to be produced is altered. Thus it is possible to automatically vary the exposure of the image forming surface in accordance with a change in the magnification of the duplicate to be produced.

By keeping the length of the short edge of the effective reflecting surface of the mirror arranged in the vicinity of the original constant, the invention enables an appropriate exposure of the image forming surface to be obtained without requiring the use of an additional device for obtaining a copy from an original.

Means for keeping the length of the short side of the reflecting surface constant comprise, a marginal masked portion of the first mirror, so that an incident light flux of a predetermined size will be reflected by the first mirror irrespective of the length of the short side of the light flux incident on the first mirror. Alternatively, the length of the short side of the first mirror may be set so that it is substantially similar to the length of the short side of the light flux without using a mask.

In an optical system, there is a variation in the transmission factor of a lens, luminocity of a lamp, the effect of illumination, etc., thereby causing a variation in the absolute light volume from one copying apparatus to another. This variation can be compensated for by adjusting the standard position of the diaphragm mounted near a photosensitive member for regulating the amount of light to which the photosensitive member is exposed, when the apparatus is assembled. In copying apparatus incorporating the present invention, such compensating means cannot be used. Therefore, according to the invention, slit regulating means which is changeable with another similar means or which can have its position adjusted may be arranged above or near the surface of the first mirror, diaphragm means may be arranged in or near the lens, or the illumination effect may be made variable in the illuminating section, so as to compensate for a variation in the absolute light volume.

While specific embodiments of the invention have been shown and described in detail to illustrate the application of the principles of the invention, it will be understood that the invention may be embodied otherwise without departing from such principles.

What is claimed is:

1. An image forming device of copying apparatus of the variable duplicate size type comprising:
   - an original placing station for placing an original thereon;
   - a first mirror for reflecting the light from a surface of said original on said original placing station;
   - an image forming surface;
   - a lens for forming an optical image of the original by transmitting the light reflected by said first mirror; and
   - at least one reflector mounted in association with the lens when necessary;
   - the length of a short side of an effective reflecting surface of said first mirror which is the length of the effective reflecting surface in the original scanning direction and the distance between the first mirror and the lens being kept constant when the original and/or the reflectors are moved for changing the rate of magnification or reduction of the original.

2. An image forming device as claimed in claim 1, wherein the length of the short side of the effective reflecting surface of the first mirror is set at a predetermined level by using a mirror having a short side of a length which agrees with the predetermined length of a short side of an optical flux.

3. An image forming device as claimed in claim 2, further comprising slit adjusting means mounted in the vicinity of the first mirror for compensating for a variation in the absolute volume of light to which the image forming surface is exposed which variation occurs when the apparatus is assembled.

4. An image forming device as claimed in claim 2, further comprising diaphragm means in or near the lens for adjusting the amount of light passing through the lens.

5. An image forming device as claimed in claim 1, wherein the length of the short side of the effective reflecting surface of the first mirror is set at a predetermined level by masking the surface of the mirror.

6. An image forming device as claimed in claim 5, further comprising slit adjusting means mounted in the vicinity of the first mirror for compensating for a variation in the absolute volume of light to which the image forming surface is exposed which variation occurs when the apparatus is assembled.

7. An image forming device as claimed in claim 5, further comprising diaphragm means mounted in or near the lens for adjusting the amount of light passing through the lens.

8. An image forming device as claimed in claim 1, further comprising slit adjusting means mounted in the vicinity of the first mirror for compensating for a variation in the absolute volume of light to which the image forming surface is exposed which variation occurs when the apparatus is assembled.

9. An image forming device as claimed in claim 1, further comprising diaphragm means mounted in or near the lens for adjusting the amount of light passing through the lens.

10. An image forming device for a copier capable of producing duplicates of various sizes comprising an original placement station for placing an original thereon, an image forming surface spaced from said original placement station, a light source associated with said original placement station for illuminating the original on said original placement station, at least one movable lens mounted between said original placement station and said image forming surface being movable to vary the duplicate size, a first mirror disposed between said original placement station and said lens for directing light from said original placement station through said lens and toward said image forming surface, at least one reflector means mounted in association with said lens, said first mirror having a short edge which is equal to the effective reflecting surface of said original placement station, the distance between said first mirror and said lens being kept constant when said original is moved for varying the duplicate size.

* * * * *

UNITED STATES PATENT AND TRADEMARK OFFICE

CERTIFICATE OF CORRECTION

PATENT NO. : 4,171,904

DATED : October 23, 1979

INVENTOR(S) : Tatsuo Tani

It is certified that error appears in the above-identified patent and that said Letters Patent is hereby corrected as shown below:

Column 6, line 36 delete "original" and insert therefore --lens--.

Signed and Sealed this

Thirty-first Day of March, 1992

*Attest:*

HARRY F. MANBECK, JR.

*Attesting Officer* *Commissioner of Patents and Trademarks*